United States Patent [19]

Crooks

[11] Patent Number: 5,458,101
[45] Date of Patent: Oct. 17, 1995

[54] LUBRICATING TANK ASSEMBLY AND SYSTEM FOR MOTORCYCLE ENGINES

[76] Inventor: William A. Crooks, P.O. Box 314, Collbran, Colo. 81624

[21] Appl. No.: 272,602

[22] Filed: Jul. 11, 1994

[51] Int. Cl.[6] .................................................. F01M 11/02
[52] U.S. Cl. ...................... 123/196 S; 184/6.23
[58] Field of Search ................ 123/196 R, 196 S, 123/196 CP; 184/6.23

[56] References Cited

U.S. PATENT DOCUMENTS

| | | | |
|---|---|---|---|
| 2,575,315 | 11/1951 | Edwards . | |
| 3,777,848 | 12/1973 | Schaeffer et al. . | |
| 3,896,901 | 7/1975 | Ango | 123/196 R |
| 4,449,493 | 5/1984 | Kopec et al. . | |
| 4,622,935 | 11/1986 | Janisch | 123/196 R |
| 4,862,995 | 9/1989 | Faria . | |
| 5,017,199 | 5/1991 | Etchepare . | |
| 5,031,580 | 7/1991 | Takagi et al. | 123/196 R |
| 5,078,233 | 1/1992 | Oetting et al. | 123/196 R |
| 5,235,944 | 8/1993 | Adachi . | |

FOREIGN PATENT DOCUMENTS 1242050  6/1967  Germany ............................ 123/196 R

*Primary Examiner*—Henry C. Yuen
*Assistant Examiner*—Erick Solis
*Attorney, Agent, or Firm*—Ancel W. Lewis, Jr.

[57] ABSTRACT

A lubricating tank assembly and system disclosed has an oversized, preferably stainless steel tank with an inverted U-tube through which the lubricant is pumped up and back down to eliminate foaming and a breather inlet tube connected to the engine breather outlet to relieve pressure, pressurizes the tank and pumps lubricant to the chain drive.

10 Claims, 2 Drawing Sheets

5,458,101

LUBRICATING TANK ASSEMBLY AND SYSTEM FOR MOTORCYCLE ENGINES

TECHNICAL FIELD

This invention generally relates to lubricating an engine and more particularly to a tank assembly and system for lubricating an engine, particularly a motorcycle engine.

BACKGROUND ART

Other known tanks for motorcycle engines have a straight outlet in the bottom of the tank which results in having the lubricant frothing or foaming resulting in a cutting down the efficiency of the operation. Further, present tanks do not have a sufficient capacity.

Etchpare U.S. Pat. No. 5,017,199 shows an inverted U-tube in a tank used for spent solvent manufacturing apparatus that is not a pressurized lubricating system. Edwards U.S. Pat. No. 2,575,315, Schaeffer U.S. Pat. No. 3,777,848 and Faria U.S. Pat. No. 4,862,995 disclose the problem of avoiding foaming in a tank but solve the problem in a substantially different manner. Adachi U.S. Pat. No. 5,235,944 is a general disclosure of a lubrication system for an internal combustion engine for a motorcycle. Kopec U.S. Pat. No. 4,449,493 discloses a slosh baffle which prevents the lubricant from sloshing toward one end or the other and at the longitudinal extremity of a tank.

DISCLOSURE OF THE INVENTION

A tank assembly and system particularly suited for a motorcycle engine having a tank preferably of stainless steel of increased holding capacity, an inverted U-tube in the tank with an inlet and an outlet connected to the crankcase of the motorcycle engine such that the lubricant is drawn up from the bottom of the tank through the U-tube to prevent funnel or tornado effects during pumping which produce frothing and foaming in the lubricant. The lubricant is pumped from the engine back into the tank. A crankcase breather tube on the top of the tank connects to a breather tube in the engine so that air mixed with oil vapor formed in the crankcase is passed from the engine crankcase into the tank to relieve back pressure and increase oil pressure in the engine and this back pressure may be used to pump lubricant from the tank to the chain to lubricate the chain that drives the motorcycle.

BRIEF DESCRIPTION OF THE DRAWINGS

Details of this invention are described in connection with the accompanying drawings which like parts bear similar reference numerals in which.

DETAILED DESCRIPTION

Figure 1:
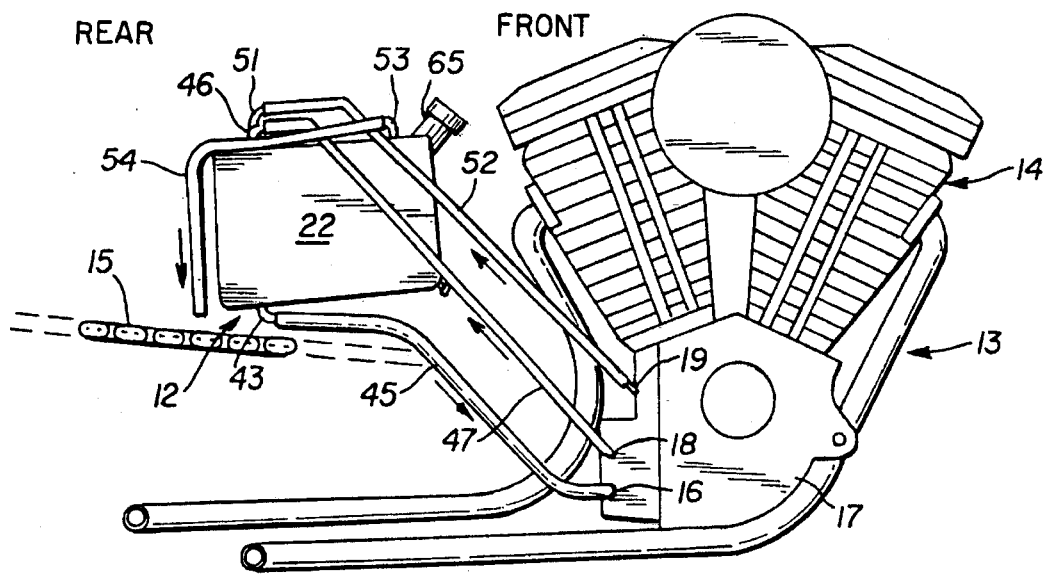
FIG. 1 is a schematic diagram showing a tank assembly for a motorcycle that is connected to a motorcycle engine embodying features of the present invention.
Figure 2:
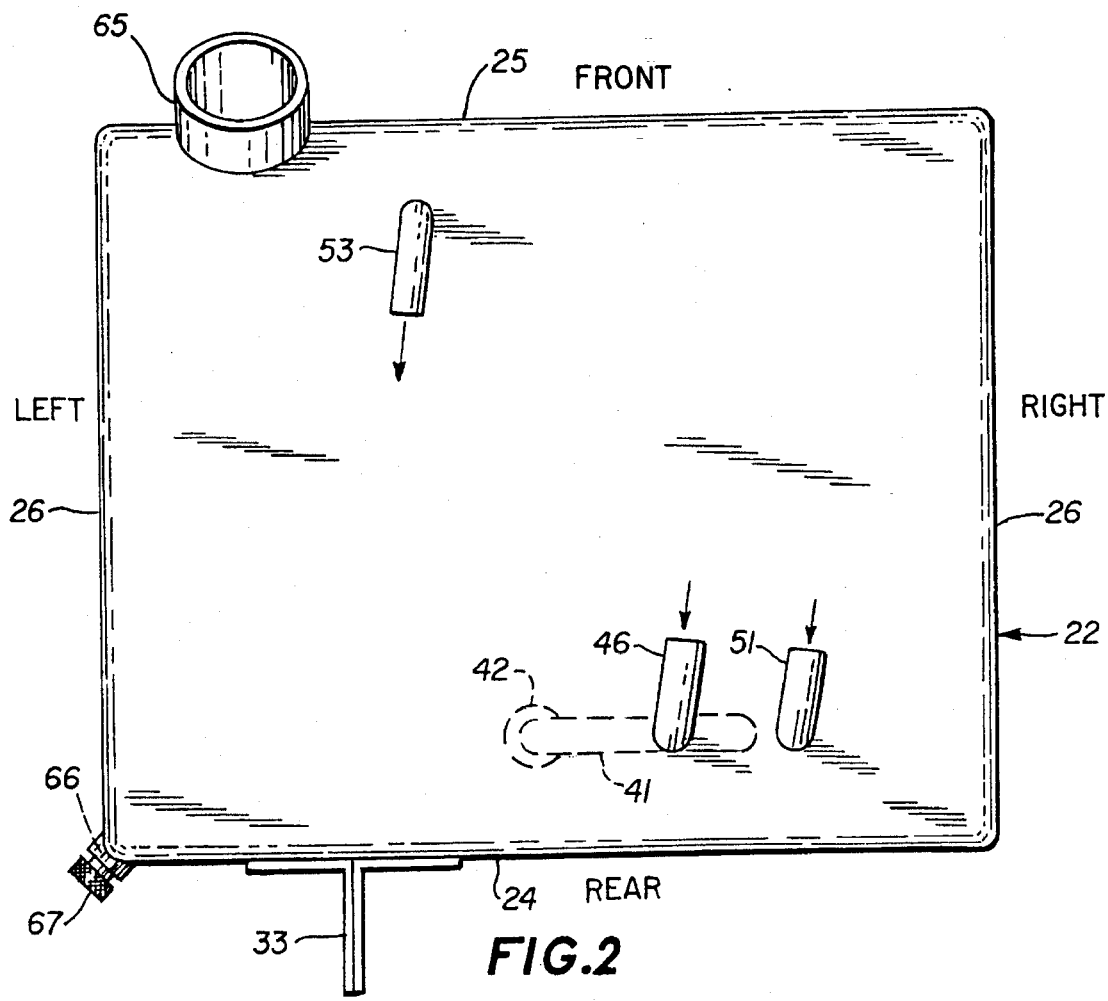
FIG. 2 is a top plan view of the tank assembly.
Figure 3:
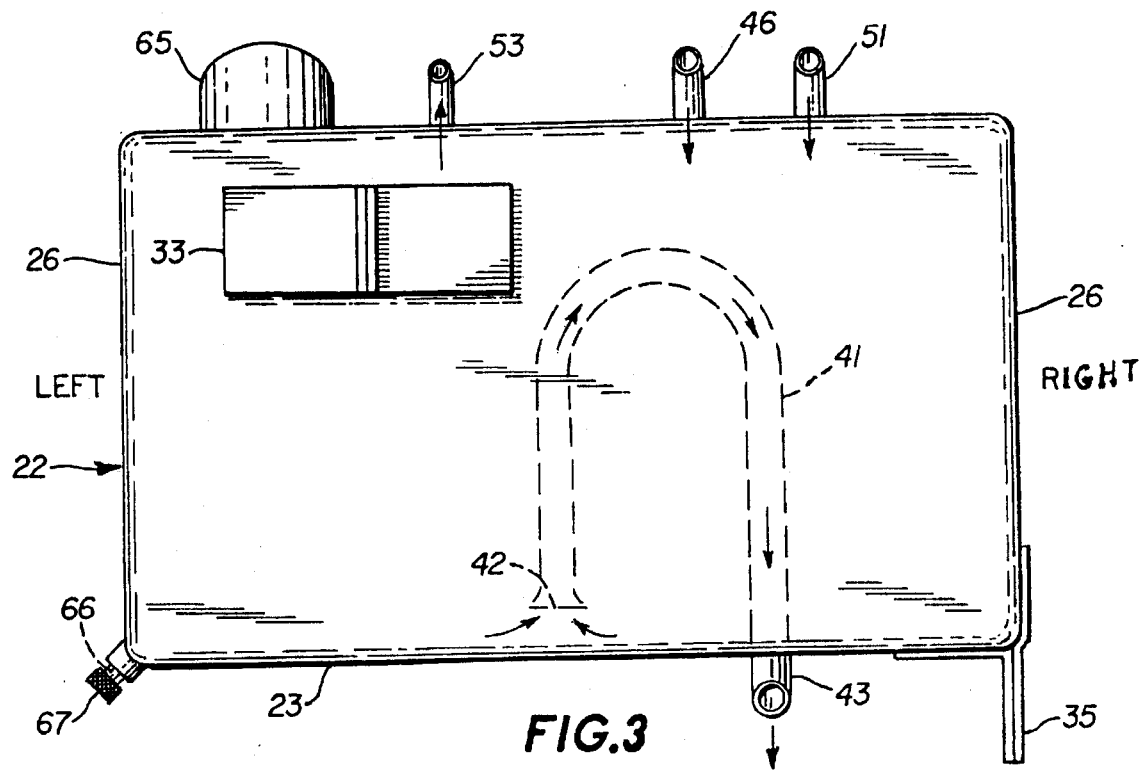
FIG. 3 is a rear elevational view of the tank assembly.
Figure 4:
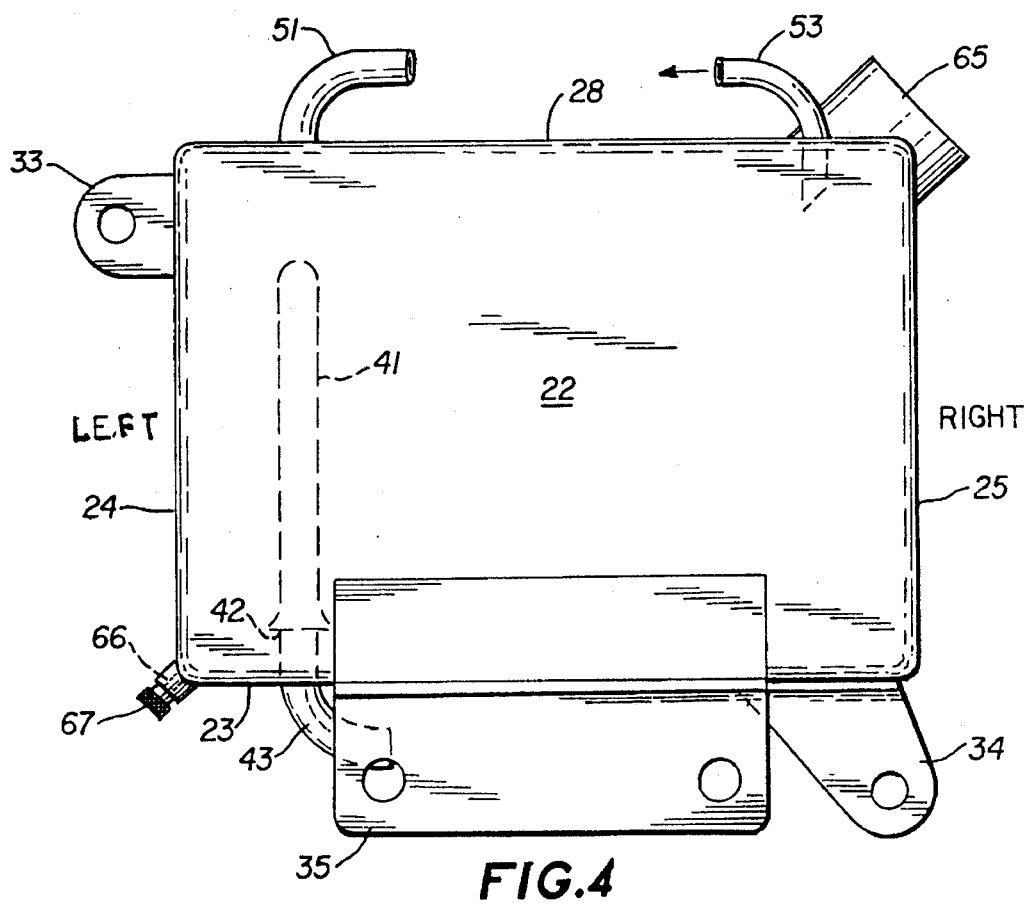
FIG. 4 is a right end side elevational view of the tank assembly.

Referring now to the drawings there is shown a lubricant tank assembly 12 embodying features of the present invention for a motorcycle 13 having an engine 14 and having a rear wheel (not shown) driven by a drive chain 15. The motorcycle engine 14 has a lubricant inlet 16 coupled to a pump (not shown) in the engine crankcase 17, a lubricant return outlet 18 through which the lubricant is pumped by the pump from the engine to the tank and a crankcase breather tube outlet 19.

The tank assembly 12 has a closed lubricant container or tank 22 that is of a generally oblong configuration having a bottom wall 23, an upright rear wall 24, upright front wall 25, a pair of opposed upright side walls 26 and a top wall 28 all preferably made of stainless steel. The holding capacity of the tank 22 is greater than the standard tank. The holding capacity of tank 22 is about 363 cubic inches. The external dimensions of the tank are 9 inches wide, 7.5 inches deep and 5.375 inches high.

There is a rear mounting bracket 33, a front mounting bracket 34 and a right side mounting bracket 35 secured on the tank 22 to secure the tank assembly to the motorcycle using nut and bolt fasteners.

An inverted U-tube 41 is mounted in the tank 22 having an inlet 42 at one end adjacent and spaced slightly above the bottom wall with an inlet leg that extends up in the tank to draw the lubricant up and the outlet leg of the U-tube extends down through the bottom wall 23 and terminates in a lubricant tube outlet 43 mounted outside and below the bottom wall. The lubricant outlet tube 43 is shown coupled to the engine lubricant inlet 16 by a delivery flow line 45. A tank lubricant return inlet 46 is provided in the top wall. The lubricant return outlet 18 is shown connected to lubricant return inlet 46 by a return flow line 47. In this way the lubricant is drawn by the pump in the crankcase upwardly into the U-tube inlet and back down the U-tube 41 and through outlet tube 43. This inverted U-tube 41 has the effect of eliminating the funnel or tornado effect in the lubricant that produces foaming and frothing in the lubricant being pumped into the crankcase.

There is further provided a tank crankcase breather inlet tube 51 in the top of the tank that connects by a breather flow line 52 to the engine crankcase breather outlet 19 to permit the crankcase to breathe freely and in the operation air is mixed with oil vapor formed in the engine crankcase 17 and is passed from the engine crankcase breather tube outlet 19 into the tank 22 via line 52 and the tank crankcase breather inlet tube 51 to relieve back pressure and increases oil pressure in the engine. The pressure developed inside of the tank 22 is shown as passed from the tank through the tank breather outlet tube 53 and is passed by a lubricating flow line 54 to the drive chain 15 to lubricate the rear drive chain 15.

The tank further includes a filler neck 65 in the top wall on the left side at the front of the tank. The neck is normally covered by a cap (not shown). A drain hole 66 in the bottom at the rear of the tank 22 is normally closed by a plug 67.

OPERATION

In a full sequence of operation when the pump in the crankcase is pumping, lubricant in the tank 22 is moved up through the tank lubricant inlet 42 passes up through one leg of the U-tube 41 and down through the other leg of the U-tube 41 and through tank lubricant outlet tube 43, travels via delivery flow line 45 to the pump as a solid foamless flow because of the direction of flow within which it is drawn from the tank. The lubricant is then pumped through the engine and returned back via return flow line 47 to the lubricant return inlet tube 46. At the same time, the crankcase is forcing air mixed with oil vapor, also known as crankcase back pressure, to the tank crankcase breather inlet tube 51 via flow line 52. This pressure is then released by the tank breather outlet tube 53 and is coupled to the rear drive chain via flow line 54 for added lubrication of the rear drive chain 15.

Although the present invention has been described with a certain degree of particularity, it is understood that the present disclosure has been made by way of example and that changes in details of structure may be made without departing from the spirit thereof.

What is claimed:

1. A lubricant tank assembly for an internal combustion engine such as a motorcycle engine having an engine lubricant inlet coupled to a pump in a crankcase, an engine lubricant return outlet through which lubricant is pumped by the pump and an engine crankcase breather tube outlet, the assembly comprising:

a tank for containing a lubricant, said tank having a bottom wall, front wall, rear wall, opposed side walls and a top wall, an inverted U-tube in said tank having an inlet at one end adjacent said bottom wall, said U-tube extending through the bottom wall and terminating in an outlet below the bottom wall for connecting to said engine lubricant inlet so that lubricant is pumped by the pump into said U-tube inlet first upwardly and then back down in said U-tube and through said U-tube outlet to prevent a funnel or tornado effect in the lubricant pumped from said tank into the crankcase, a tank lubricant return inlet tube in said top wall for connecting to said engine lubricant return outlet to return lubricant from said engine to said tank, and a tank crankcase breather inlet tube in said top wall for connection with said engine crankcase breather outlet tube to permit the crankcase to breathe freely and whereby air mixed with oil vapor formed in the crankcase is passed from said engine crankcase breather tube into said tank.

2. A lubricant tank assembly as set forth in claim 1 including a filler neck in said tank to enable the filling of the tank with lubricant.

3. A lubricant tank assembly as set forth in claim 1 including a tank breather outlet tube in said top wall to vent air mixed with oil vapor to the atmosphere.

4. A lubricant tank assembly as set forth in claim 3 including a flow line coupled to said tank breather outlet tube and terminating adjacent a rear chain drive of a motorcycle to lubricate the rear chain drive.

5. A lubricant tank assembly as set forth in claim 1 including a drain hole in the bottom of said tank normally closed by a removable drain plug.

6. A lubricant tank assembly as set forth in claim 1 wherein said tank is made of stainless steel and has an increased capacity to hold more lubricant than the conventional lubricant tank.

7. A lubricant tank assembly as set forth in claim 1 including bracket means attached to said tank to enable said tank to be fastened to a motorcycle.

8. A lubricant tank assembly as set forth in claim 7 wherein said bracket means includes a front bracket in said front wall, a side bracket on one of said side walls and a rear bracket on said rear wall.

9. A lubricant tank assembly for an internal combustion engine such as a motorcycle engine having an engine lubricant inlet coupled to a pump in a crankcase, an engine lubricant return outlet through which lubricant is pumped by the pump and an engine crankcase breather tube outlet, the assembly comprising:

a closed tank for containing a lubricant, said tank having a bottom wall, front wall, rear wall, opposed side walls and a top wall, an inverted U-tube in said tank having an inlet at one end adjacent said bottom wall, said U-tube extending through the bottom wall and terminating in an outlet below the bottom wall for connecting to said engine lubricant inlet so that lubricant is pumped by the pump into said U-tube inlet first upwardly and then back down in said U-tube and through said U-tube outlet to prevent a funnel or tornado effect in the lubricant pumped from said tank into the crankcase, a tank lubricant return inlet tube in said top wall for connecting to said engine lubricant return outlet to return lubricant from said engine to said tank, a tank crankcase breather inlet tube in said top wall for connection with said engine crankcase breather outlet tube to permit the crankcase to breathe freely and whereby air mixed with oil vapor formed in the crankcase is passed from said engine crankcase breather tube into said tank, a filler neck in the tank, a tank breather outlet tube in the top wall coupled via a flow line to the rear chain drive to lubricate the rear chain drive, and a drain hole in the tank normally closed by a removable drain plug.

10. In a lubricating system for a motorcycle engine having an engine lubricant inlet coupled to a pump in a crankcase, an engine lubricant return outlet through which lubricant is pumped by the pump and an engine crankcase breather tube outlet, a tank containing a lubricant, said tank having a bottom wall, front wall, rear wall, opposed side walls and a top wall, an inverted U-tube in said tank having an inlet at one end adjacent said bottom wall, said U-tube extending through the bottom wall and terminating in an outlet below the bottom wall connected to said engine lubricant inlet so that lubricant is pumped by the pump into said U-tube inlet first upwardly and then back down in said U-tube and through said U-tube outlet to prevent a funnel or tornado effect in the lubricant pumped from said tank into the crankcase, a tank lubricant return inlet tube in said top wall connected to said engine lubricant return outlet to return lubricant from said engine to said tank, and a tank crankcase breather inlet tube in said top wall connected to said engine crankcase breather outlet tube to permit the crankcase to breathe freely and whereby air mixed with oil vapor formed in the crankcase is passed from said engine crankcase breather tube into said tank.

* * * * *